(12) United States Patent
Igarashi et al.

(10) Patent No.: US 8,043,023 B2
(45) Date of Patent: Oct. 25, 2011

(54) POWER TRANSMISSION MECHANISM OF SHAFT AND HUB

(75) Inventors: Masahiko Igarashi, Tochigi-ken (JP);
Takeshi Mochizuki, Tochigi-ken (JP);
Masanori Kosugi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 245 days.

(21) Appl. No.: 10/567,404

(22) PCT Filed: Mar. 8, 2004

(86) PCT No.: PCT/JP2004/011080
§ 371 (c)(1),
(2), (4) Date: Feb. 6, 2006

(87) PCT Pub. No.: WO2005/015041
PCT Pub. Date: Feb. 17, 2005

(65) Prior Publication Data
US 2006/0291954 A1    Dec. 28, 2006

(30) Foreign Application Priority Data

| Aug. 7, 2003 | (JP) | ................ 2003-288544 |
| Aug. 7, 2003 | (JP) | ................ 2003-288547 |
| Aug. 7, 2003 | (JP) | ................ 2003-288551 |
| Jul. 13, 2004 | (JP) | ................ 2004-205716 |
| Jul. 14, 2004 | (JP) | ................ 2004-207464 |
| Jul. 14, 2004 | (JP) | ................ 2004-207557 |

(51) Int. Cl.
*B25G 3/28* (2006.01)

(52) U.S. Cl. ................. 403/359.1; 403/359.5; 403/359.6
(58) Field of Classification Search ............ 403/359.1, 403/359.5, 359.6; 464/179, 182
See application file for complete search history.

(56) References Cited

U.S. PATENT DOCUMENTS 4,115,022 A    9/1978   Orain
(Continued)

FOREIGN PATENT DOCUMENTS

DE          26 56 946 A1    6/1978
(Continued)

OTHER PUBLICATIONS

Co-pending; co-related; unpublished; U.S. Appl. No. 10/567,404, filed Feb. 6, 2006; By: Masahiko Igarashi et al.; Title: Power Transmission Mechanism of Shaft and Hub.

*Primary Examiner* — Victor MacArthur
(74) *Attorney, Agent, or Firm* — Arent Fox LLP

(57) ABSTRACT

A power transmission mechanism of a shaft and a hub, wherein a shaft tooth part having a plurality of linear spline teeth is formed at the end part of the shaft and a hub tooth part having a plurality of linear spline teeth fitted to the end part of the shaft is formed in the inner peripheral surface of a shaft hole in the hub. A first step part is formed by swelling the shaft tooth part toward the hub tooth part from a point (P1) horizontally moved from the center point (P0) of the shaft tooth part to a shaft shank side. On the ridge part side of the hub tooth part, a point is set at a position offset from the point (P1) horizontally to the opposite side of the shaft shank, and a second step part increased in a diameter from the point (P2) in the radial outer direction is formed.

2 Claims, 19 Drawing Sheets

U.S. PATENT DOCUMENTS

| | | | |
|---|---|---|---|
| 4,175,404 A | 11/1979 | Schöpf | |
| 4,509,381 A | 4/1985 | Ikemoto et al. | |
| 5,503,494 A | 4/1996 | Kamata et al. | |
| 5,536,101 A * | 7/1996 | Schwarzler et al. | 403/359.5 |
| 5,580,183 A * | 12/1996 | Brackoneski et al. | 403/359.1 |
| 5,660,494 A | 8/1997 | Schwärzler et al. | |
| 5,779,551 A * | 7/1998 | Stall et al. | 403/359.6 |
| 6,142,033 A | 11/2000 | Beigang | |
| 6,685,572 B2 * | 2/2004 | Makino et al. | 403/359.6 |
| 7,052,402 B2 * | 5/2006 | Ichikawa et al. | 403/359.6 |
| 7,614,818 B2 * | 11/2009 | Gutierrez et al. | 403/359.5 |

FOREIGN PATENT DOCUMENTS

| | | |
|---|---|---|
| DE | 91 16 324 U1 | 8/1992 |
| DE | 195 23 584 A1 | 1/1997 |
| EP | 1 016 801 A1 | 7/2000 |
| FR | 1581658 A | 9/1969 |
| FR | 2 562 969 A1 | 10/1985 |
| FR | 2 802 255 A | 6/2001 |
| GB | 855282 | 11/1960 |
| GB | 1 224 419 A | 3/1971 |
| JP | 33-10508 | 12/1958 |
| JP | 02-062461 A | 3/1990 |
| JP | 03-032436 A | 2/1991 |
| JP | 03-069844 A | 3/1991 |
| JP | 4-116017 | 10/1992 |
| JP | 7-301304 A | 11/1995 |
| JP | 09042303 A * | 2/1997 |
| JP | 9-512610 | 12/1997 |
| JP | 11-514079 A | 11/1999 |
| JP | 2000-097244 | 4/2000 |
| JP | 2000-097244 A | 4/2000 |
| JP | 2001-287122 A | 10/2001 |
| JP | 2001-343023 | 12/2001 |
| JP | 2005-069741 A | 3/2005 |
| SU | 398782 | 9/1973 |
| WO | 97/01714 A1 | 1/1997 |

* cited by examiner

FIG. 6

| TILT ANGLE θ | 3° | 5° | 10° | 15° | 25° | 35° | 45° | 90° |
|---|---|---|---|---|---|---|---|---|
| STRESS RELAXATION | × | ○ | ◎ | ◎ | ◎ | ◎ | ○ | × |
| PRODUCTIVITY | × | ○ | ◎ | ◎ | ◎ | ◎ | ○ | × |

FIG. 16

| TILT ANGLE θ | 3° | 5° | 10° | 15° | 25° | 35° | 45° | 90° |
|---|---|---|---|---|---|---|---|---|
| STRESS RELAXATION | × | ○ | ◎ | ◎ | ◎ | ◎ | ○ | × |
| PRODUCTIVITY | × | ○ | ◎ | ◎ | ◎ | ◎ | ○ | × |

POWER TRANSMISSION MECHANISM OF SHAFT AND HUB

CROSS-REFERENCE TO RELATED APPLICATION

This application is a National Stage entry of International Application No. PCT/JP2004/011080, filed Aug. 3, 2004, the entire specification claims and drawings of which are incorporated herewith by reference.

TECHNICAL FIELD

The present invention relates to a power transmitting mechanism for transmitting torque smoothly between two members comprising a shaft and a hub.

BACKGROUND ART

On motor vehicles such as automobiles, there have been employed a set of constant velocity joints for transmitting drive power from an engine through a shaft to axles. Each constant velocity joint comprises an outer member, an inner member, and a torque transmitting member disposed between the outer and inner members for transmitting torque between the outer and inner members. The constant velocity joint includes a shaft/hub unit having a tooth assembly which comprises a shaft tooth section on the shaft and a hub tooth section on a hub, the shaft tooth section and the hub tooth section being held in mesh with each other.

In recent years, there have been demands for efforts to reduce circumferential backlash of constant velocity joints which is caused by the chattering of the power transmitting system. Heretofore, attempts have been made to reduce backlash between the inner ring and the shaft with a constant velocity joint having shaft serrations tilted at a torsional angle. Depending on the direction of the torsional angle and the direction of the torque load, the mechanical strength and service life of the inner ring and the shaft are likely to vary from product to product.

In the art of gears, technical concepts for crowning tooth surfaces have been disclosed in Japanese Laid-Open Patent Publication No. 2-62461, Japanese Laid-Open Patent Publication No. 3-69844, and Japanese Laid-Open Patent Publication No. 3-32436, for example.

The applicant of the present application has proposed a spline shaft wherein the crowning top is positioned where the stress is minimized when torque is applied to a region where, the spline shaft and a constant velocity joint mesh with each other, thereby preventing the stress from concentrating on certain regions and simplifying the overall structure of the spline shaft (see Japanese Laid-Open Patent Publication No. 2001-287122).

SUMMARY OF THE INVENTION

It is a general object of the present invention to provide a power transmitting mechanism for a shaft and a hub, which is designed to prevent stresses from concentrating on certain regions for increased static mechanical strength and fatigue strength.

According to the present invention, when torque is applied to a portion between a shaft and a hub wherein a shaft tooth section and a hub tooth section are held in mesh with each other, by increasing the outside diameter of a valley of the shaft tooth section, which is a stress concentrating region, the stresses are distributed and strength of the shaft is increased.

Further, according to the present invention, since a changing point of the outside diameter of the valley of the shaft tooth section and a changing point of the inside diameter of a peak of the hub tooth section are offset from each other by a predetermined distance, the stresses imposed on the shaft tooth section are distributed to one changing point and the other changing point, thereby relaxing stress concentration. As a result, the stress concentration is relaxed and distributed, thus increasing static mechanical strength and fatigue strength of the area where the shaft tooth section and the hub tooth section mesh with each other.

BRIEF DESCRIPTION OF THE DRAWINGS

FIG. 6 is a diagram showing the relationship between the tilt angle θ of the first step region of the shaft tooth section, stress relaxation, and productivity;

FIG. 16 is a diagram showing the relationship between the tilt angle θ of the step region of the shaft tooth section, stress relaxation, and productivity;

BEST MODE FOR CARRYING OUT THE INVENTION

Figure 1:
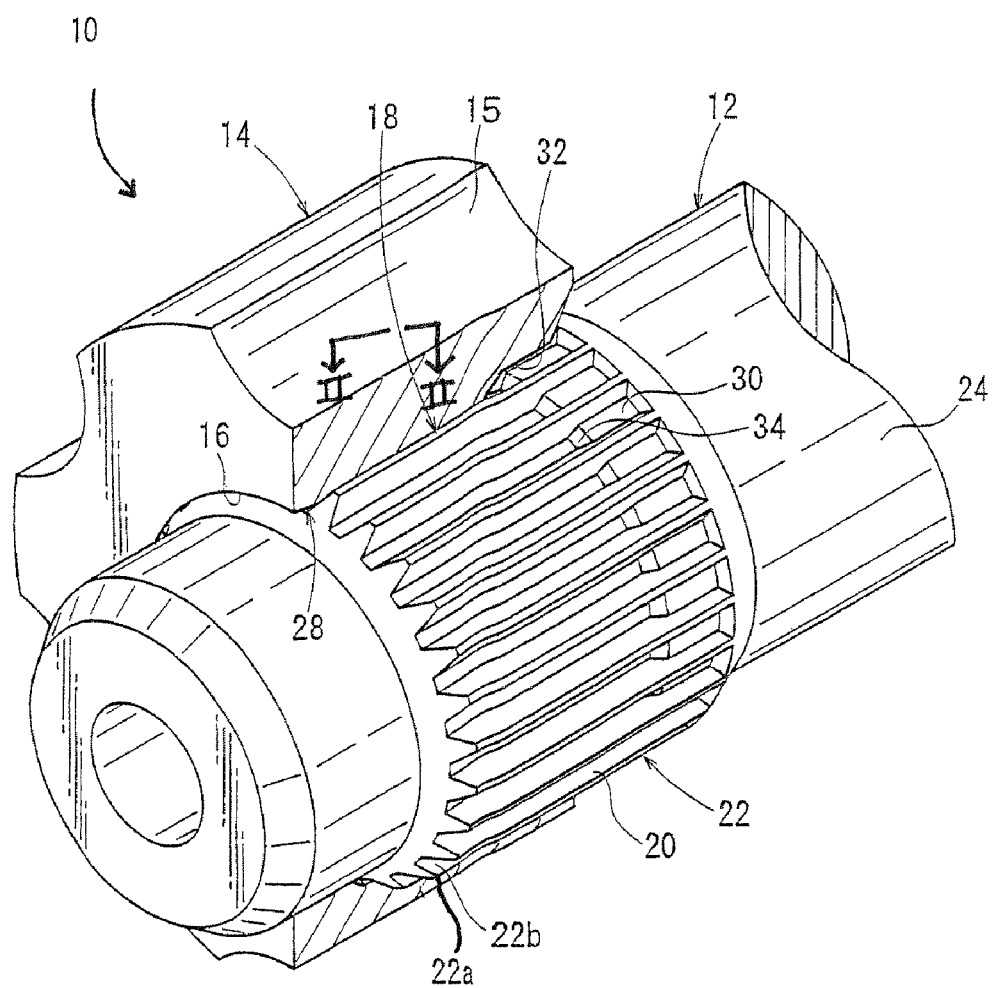
FIG. 1 is a perspective view, partly cut away, of a shaft/hub unit which incorporates a power transmitting mechanism according to a first embodiment of the present invention.

FIG. 1 shows a shaft/hub unit 10 which incorporates a power transmitting mechanism according to a first embodiment of the present invention. The shaft/hub unit 10 serves as part of a constant velocity joint. The shaft/hub unit 10 comprises a shaft 12 functioning as a power transmitting shaft and a hub 14 functioning as an inner ring that is disposed in openings in an outer cup (not shown) and has guide grooves 15 receiving therein balls (not shown).

Figure 2:
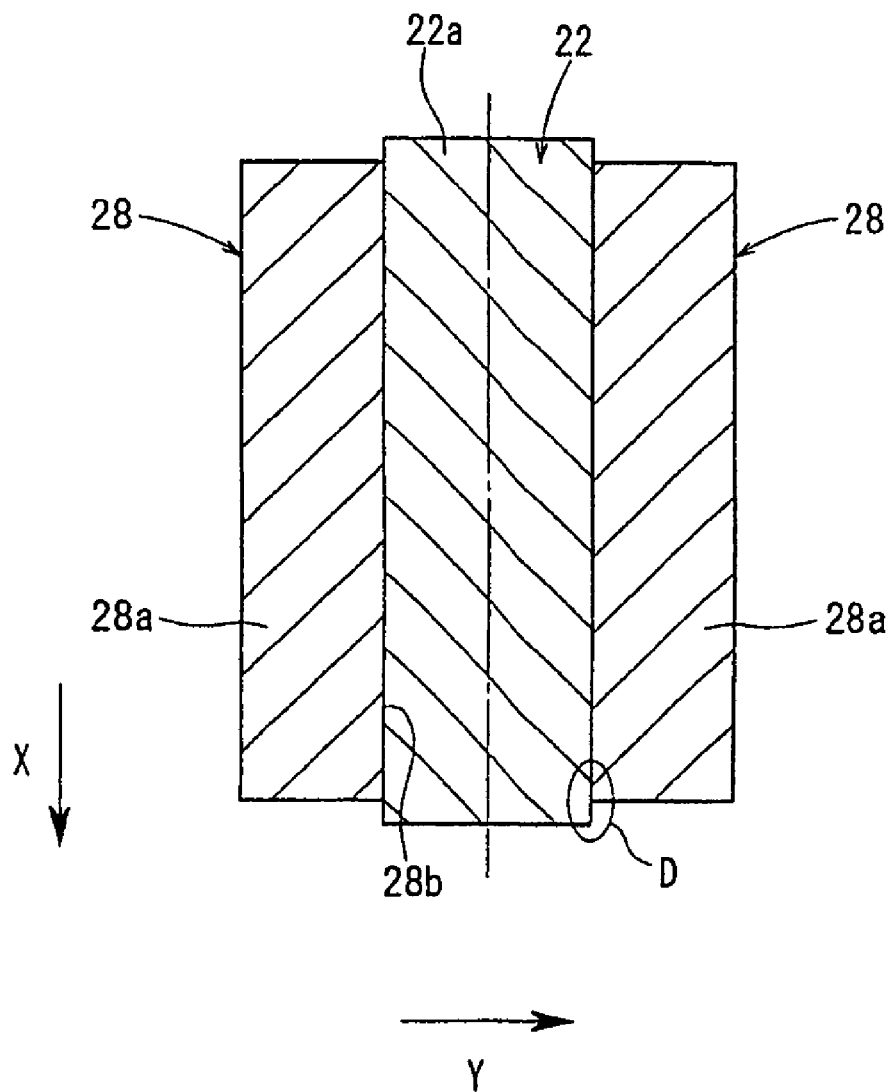
FIG. 2 is an enlarged partial transverse cross-sectional view showing a shaft tooth section and a hub tooth section which are held in mesh with each other in the shaft/hub unit shown in FIG. 1.

The shaft 12 has fitting portions 18 on its respective opposite ends each fitting in an axial hole 16 in the hub 14. In FIG. 1, only one end of the shaft 12 is shown, with the other end omitted from illustration. The fitting portion 18 has a shaft tooth section 22 comprising a plurality of straight spline teeth 20 which have a predetermined tooth length in the axial direction of the shaft 12 and which are formed successively in the circumferential direction of the shaft 12. Specifically, the shaft tooth section 22 comprises a circumferentially alternate succession of convex peaks 22a (the other embodiment of which is illustrated in the appropriate figures with the following corresponding reference number 22a') and concave valleys 22b. As shown in FIG. 2, the peaks 22a of the shaft tooth section 22 have substantially the same tooth thickness, and extend substantially parallel to the axis of the shaft 12 (see FIG. 1).

The shaft 12 has a shaft shank 24 extending from an end of the shaft tooth section 22 which is closer to the center of the shaft 12. A retaining ring (not shown) is mounted in an annular groove (not shown) defined in the end of the shaft 12 for preventing the hub 14 from being released from the shaft 12.

The hub 14 has, on the inner circumferential surface of the axial hole 16, a hub tooth section 28 having a plurality of straight spline teeth 26 that fit in the fitting portion 18 of the shaft 12. Specifically, the hub tooth section 28 comprises a circumferentially alternate succession of convex peaks 28a and concave valleys 28b. As shown in FIG. 2, the peaks 28a have substantially the same tooth thickness and extend substantially parallel to the axial direction of the shaft 12.

Figure 3:
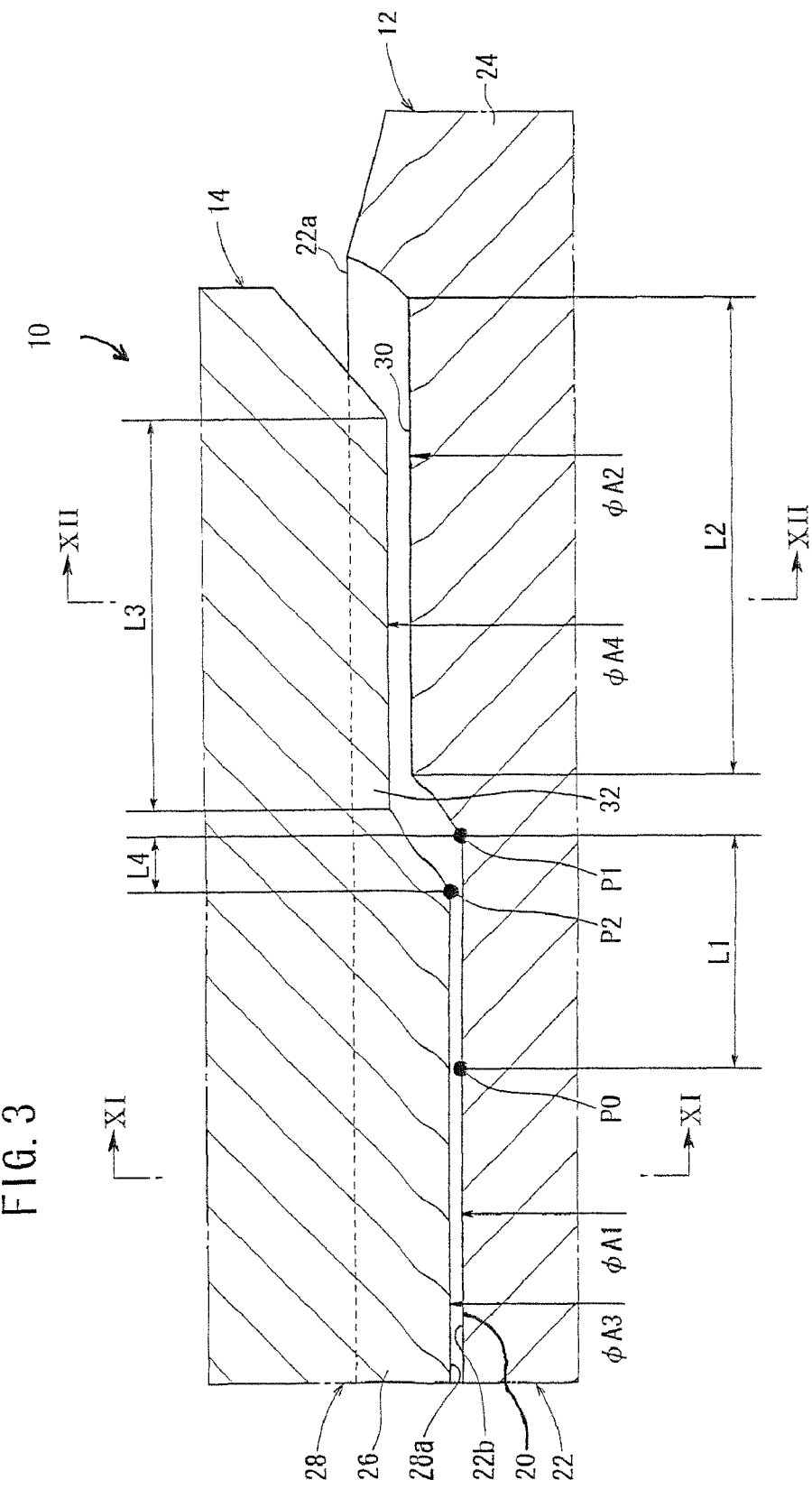
FIG. 3 is an enlarged partial longitudinal cross-sectional view in the axial direction of a shaft, showing a peak of the hub tooth section which engages in a valley of the shaft tooth section shown in FIG. 1.

FIG. 3 shows, in enlarged partial longitudinal cross section in the axial direction of the shaft 12, that a peak 28a of the hub tooth section 28 engages in a valley 22b of the shaft tooth section 22. In FIG. 3, a position corresponding to an axially central point of the shaft tooth section 22 is represented by P0.

A point P1 (changing point) is established on the bottom land of the valley 22b at a position which is displaced horizontally a predetermined distance L1 toward the shaft shank 24 from the central point P0 of the shaft tooth section 22 on the bottom land of the valley 22b (valley radius φA1). From the point P1, the bottom land of the valley 22 is raised radially outwardly toward the hub tooth section 28, providing a first step region 30 having a valley radius φA2. The first step region 30 extends horizontally a predetermined distance L2 toward the shaft shank 24 and is joined to the shaft shank 24.

The first step region 30 of the shaft tooth section 22 may have a slanted surface or an arcuate curved surface or a compound surface having a predetermined radius of curvature.

Figure 4:
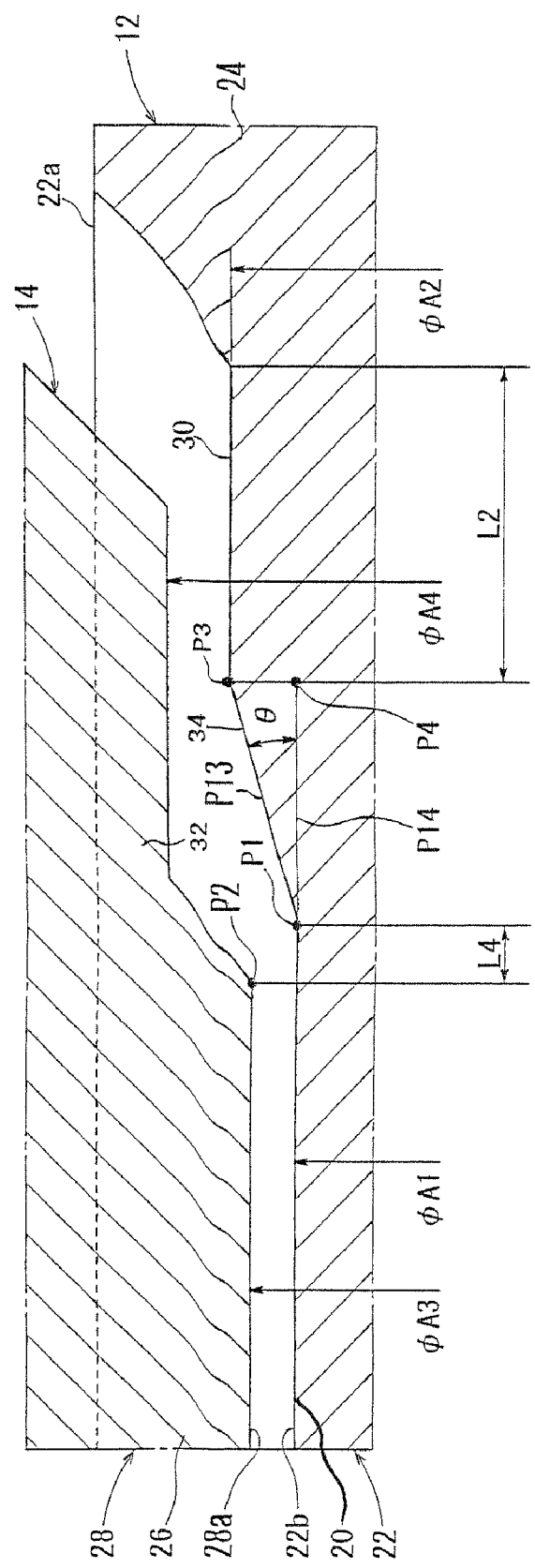
FIG. 4 is an enlarged partial longitudinal cross-sectional view showing a tapered surface of a first step region slanted at a smaller tilt angle θ of the shaft shown in FIG. 3.
Figure 5:
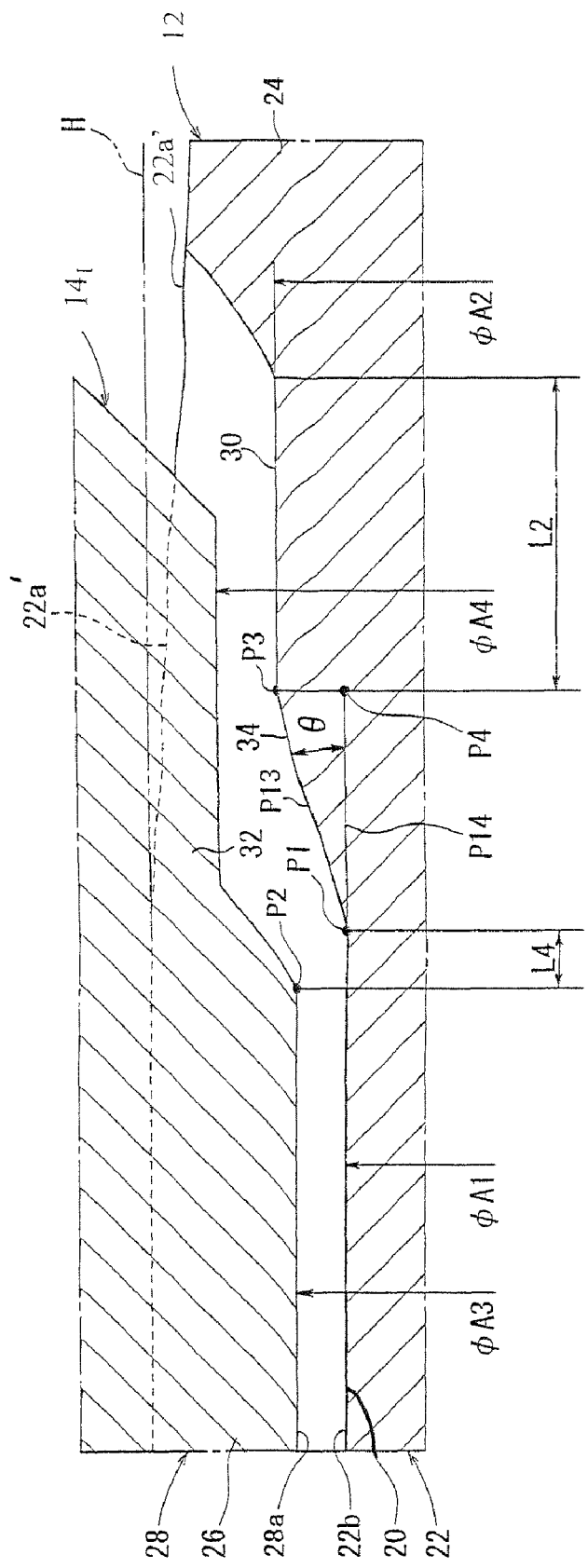
FIG. 5 is an enlarged partial longitudinal cross-sectional view showing a tooth of the shaft tooth section whose outside diameter varies toward a shaft shank of the shaft shown in FIG. 4.

The peak 22a of the shank tooth section 22 has an outside diameter which may remain constant in the axial direction, as shown in FIGS. 3 and 4, or which may progressively decrease from an area close to the point P1 toward the shaft shank 24, as shown as 22a' in FIG. 5. With the outside diameter of the peak 22a' progressively decreasing toward the shaft shank 24, the shaft tooth section 22 can easily be manufactured by rolling racks, as described later on, and the function of the shaft tooth section 22 to transmit torque is not lowered. In FIG. 5, the reference character "H" represents a horizontal line to be compared with a change (reduction) in the outside diameter of the peak 22a'.

On the peak 28a of the hub tooth section 28, there is established a point P2 at a position which is offset a predetermined distance L4 from the point P1 in the shaft tooth section 22 in a horizontal direction away from the shaft shank 24. From the point P2, the peak 28a changes its peak radius φA3 to a peak radius φA4, providing a second step region 32 with the peak radius φA4. The second step region 32 extends horizontally a predetermined distance L3 toward the shaft shank 24.

The second step region 32 of the hub tooth section 28 may have a slanted surface or an arcuate curved surface or a compound surface having a predetermined radius of curvature, and may be of a shape different from the shape of the first step region 30. The tilt angle of the second step region 32 is set as desired complementarily to the tilt angle of the first step region 30. The shape of the hub tooth section 28 is not limited to the shape of the second step region 32, but may include a round shape, a tapered tape, or the like having a predetermined radius of curvature. The valleys 28b of the hub tooth section 28 have an inside diameter which remains constant.

The valley radii ΦA1, ΦA2 represent respective distances from the central axis of the shaft 12 to the bottom lands of the valley 22b of the shaft tooth section 22. The peak radii ΦA3, ΦA4 represent respective distances from the central axis of the shaft 12 to the top lands of the peak 28a of the hub tooth section 28.

The distance L2 in the shaft tooth section 22 may be set to a value greater than the distance L1 in the shaft tooth section 22 (L1<L2). The distance L2 in the shaft tooth section 22 and the distance L3 in the hub tooth section 22 may be set to substantially equal values (L2 L3), or the distance L3 in the hub tooth section 22 may be set to a value greater than the distance L2 in the shaft tooth section 22 (L2<L3), for allowing an offset (described later) to be easily established depending on dimensional tolerance and dimensional accuracy and also for improving the ease in assembling the shaft 12 and the hub 14 together. In FIG. 3, the distance L2 and the distance L3 are not plotted accurately to actual dimensions.

As can be seen from FIG. 3, the point P1 as a starting point (changing point) where the first step region 30 of the shaft tooth section 22 starts to rise and the point P2 as a starting point (changing point) where the second step region 32 of the hub tooth section 28 starts to rise are offset substantially horizontally from each other by a predetermined distance L4.

Therefore, when torque is applied to the shaft/hub unit 10 wherein the shaft tooth section 22 and the hub tooth section 28 mesh with each other, since the point P1 in the shaft tooth section 22 and the point P2 in the hub tooth section 28 are offset from each other by the distance L4, the stresses imposed on the shaft/hub unit 10 are distributed to the points P1, P2, thereby relaxing stress concentration. As a result, static mechanical strength and fatigue strength of the area where the shaft tooth section 22 and the hub tooth section 28 mesh with each other are increased.

In FIG. 4, a right-angled triangle formed by interconnecting points P1, P3, P4 may have its cross-sectional area increased, and the angle θ formed between a line segment P14 interconnecting the points P1, P4 and a line segment P13 interconnecting the points P1, P3, i.e., the tilt angle θ of the first step region 30, may be set to a smaller value for further relaxing stress concentration with a tapered surface 34 of the first step region 30.

The relationship between the tilt angle θ of the first step region 30, stress relaxation, and productivity is shown in FIG. 6. It can be seen from FIG. 6 that stress relaxation and productivity are good (see symbol "○") if the tilt angle θ is set to a value in the range from 5 degrees to 45 degrees, and optimum (see symbol "◉") if the tilt angle θ is set to a value in the range from 10 degrees to 35 degrees.

If the tilt angle θ is set to 3 degrees, no sufficient stress distribution capability is available, and it is difficult to manufacture the shaft tooth section 22 with rolling racks, to be described later. If the tilt angle θ is set to 90 degrees, excessive stresses concentrate on the first step region 30, and the durability of rolling racks used to manufacture the shaft tooth section 22 is reduced.

Figure 7:
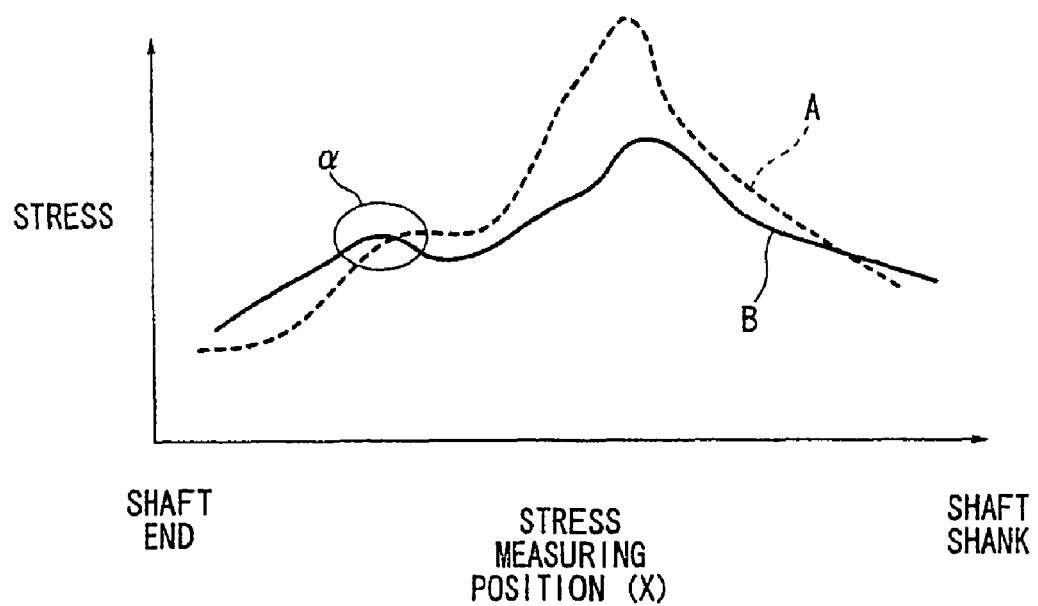
FIG. 7 is a graph showing the relationship between stresses developed on the shaft and positions where the stresses are measured with respect to a shaft wherein a first step region and a second step region are not formed in a shaft tooth section and a hub tooth section and a shaft wherein a first step region and a second step region are formed in a shaft tooth section and a hub tooth section.

FIG. 7 shows a characteristic curve A (broken-line curve) of stresses on a comparative shaft wherein the first step region 30 and the second step region 32 are not formed in the shaft tooth section 22 and the hub tooth section 28 and a characteristic curve B (solid-line curve) of stresses on a shaft wherein the points P1, P2 are offset from each other by the predetermined distance L4 shown in FIG. 4 and the tilt angle θ of the first step region 30 is set to a large value. A comparison between the characteristic curve A and the characteristic curve B indicates that according to the characteristic curve B which represents the structure shown in FIG. 4, the peak of stresses is reduced and the concentration of stresses is relaxed.

Figure 8:
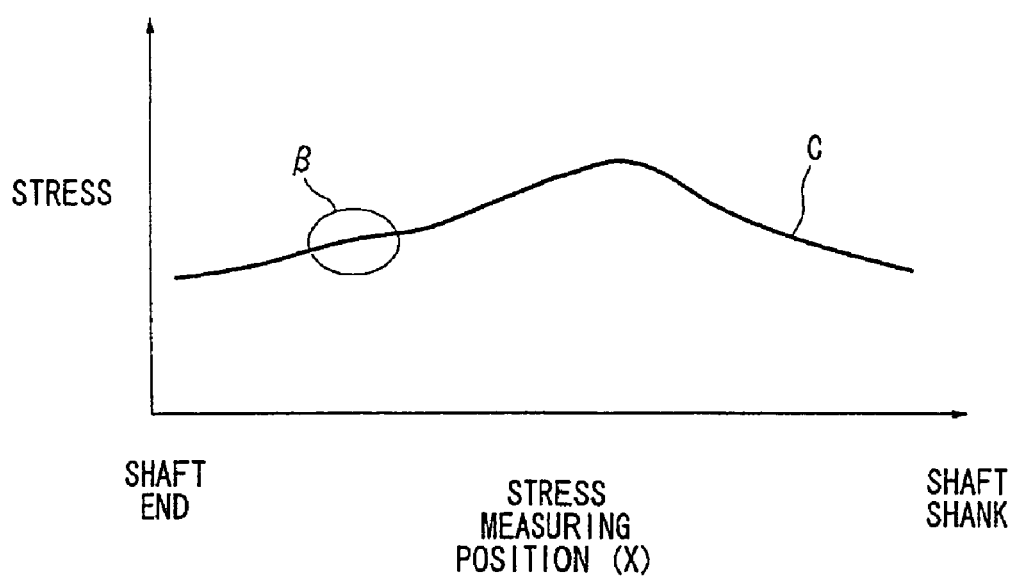
FIG. 8 is a graph showing the relationship between stresses developed on the shaft and positions where the stresses are measured with respect to a shaft wherein a first step region is slanted at a much smaller tilt angle θ.

FIG. 8 shows a characteristic curve C of stresses on a shaft wherein the tilt angle θ of the first step region 30 is smaller than with the characteristic curve B. It can be understood from FIG. 8 that by reducing the tilt angle θ to increase the size of the tapered surface 34, the tapered surface 34 is capable of more relaxing stresses (compare a portion α of the characteristic curve B shown in FIG. 7 and a portion β of the characteristic curve C shown in FIG. 8).

Figure 9:
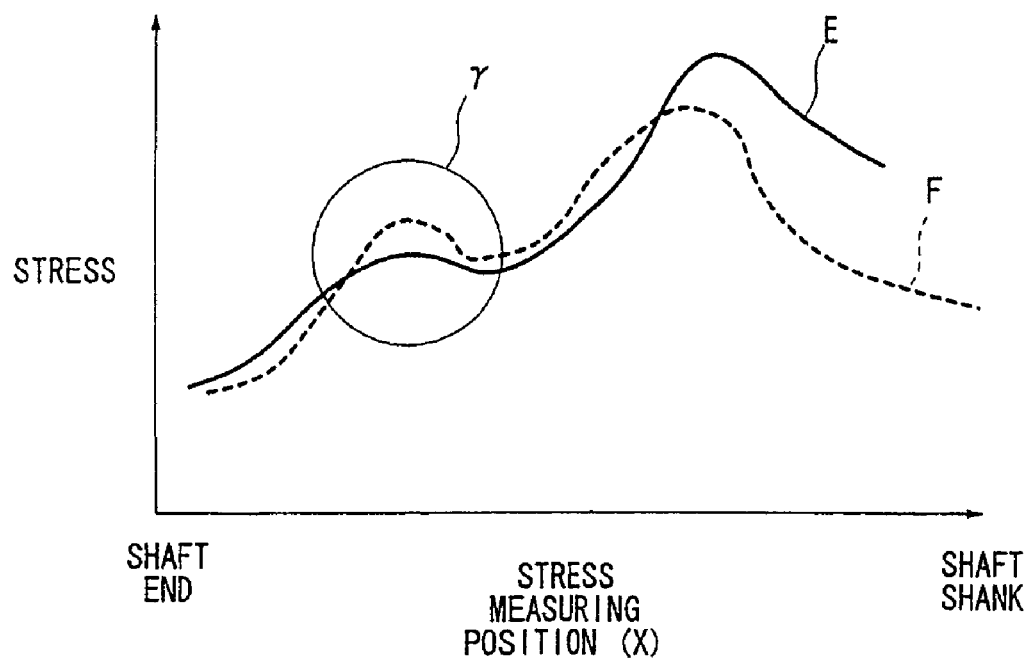
FIG. 9 is a graph showing the relationship between stresses developed on the shaft and positions where the stresses are measured, with respect to a shaft wherein a changing point of the diameter of a shaft tooth section and a changing point of the diameter of a hub tooth section are offset from each other and to a shaft wherein a changing point of the diameter of a shaft tooth section and a changing point of the diameter of a hub tooth section are not offset from each other.

FIG. 9 shows a characteristic curve E (solid-line curve) of stresses on a shaft wherein the point P1 in the shaft tooth section 22 and the point P2 in the hub tooth section 28 are offset from each other by a predetermined distance, and a characteristic curve F (broken-line curve) of stresses on a shaft wherein the points P1, P2 are not offset from each other, i.e., the distance by which the points P1, P2 are spaced horizontally from each other is nil.

A comparison of offset and offset-free portions (see portions γ of the characteristic curves E, F) shows that the characteristic curve E of the shaft wherein the starting point P1 (see FIGS. 3 and 4) in the shaft tooth section 22 and the starting point P2 (see FIGS. 3 and 4) in the hub tooth section 28 are offset from each other is more gradual than the characteristic curve F wherein the starting points P1, P2 are not offset from each other. The offset starting points P1, P2 are effective in relaxing stresses in the area where the radii change.

FIG. 2 shows the manner in which the straight peak 22a of the shaft tooth section 22 and the straight peaks 28a of the hub tooth section 28, which are held in mesh with each other, are in mesh with each other when torque is applied to them in their unloaded state. It is assumed that when torque is applied to the peaks 22a, 28a, a load is applied to them in the direction indicated by the arrow Y which is perpendicular to the axis of the shaft tooth section 22.

Figure 10:
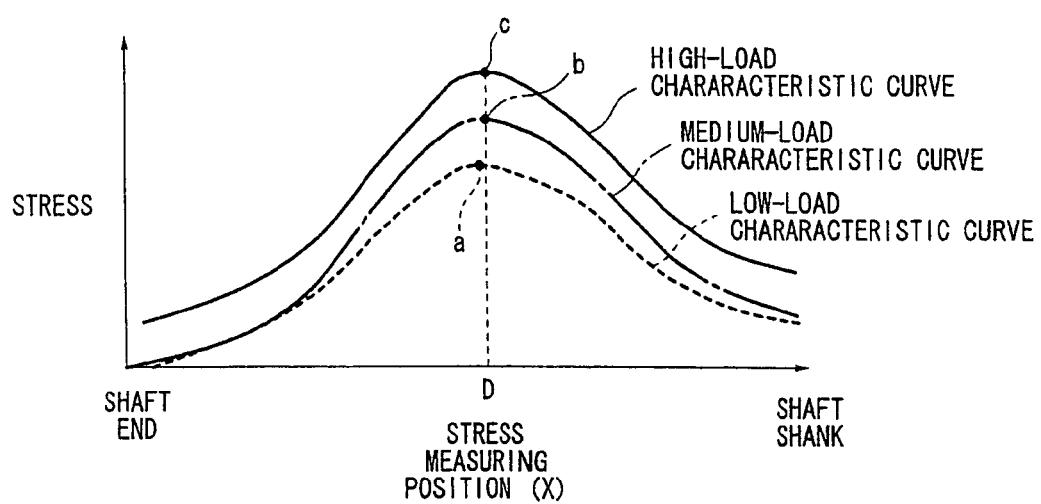
FIG. 10 is a graph showing the relationship between stresses developed on the shaft and positions where the stresses are measured when the stresses are produced in response to an input load imposed at the time torque is applied.

FIG. 10 shows the relationship between stresses developed on the shaft and positions where the stresses are measured (see the arrow X in FIG. 2). If the magnitude of the applied load varies through three stages, i.e., a low load, a medium load, and a high load, then it can be seen that the peak points of stresses reside in substantially the same measuring position D as indicated by points a, b, c, from a low-load characteristic curve, a medium-load characteristic curve, and a high-load characteristic curve which correspond to the above stages, respectively.

Figure 11:
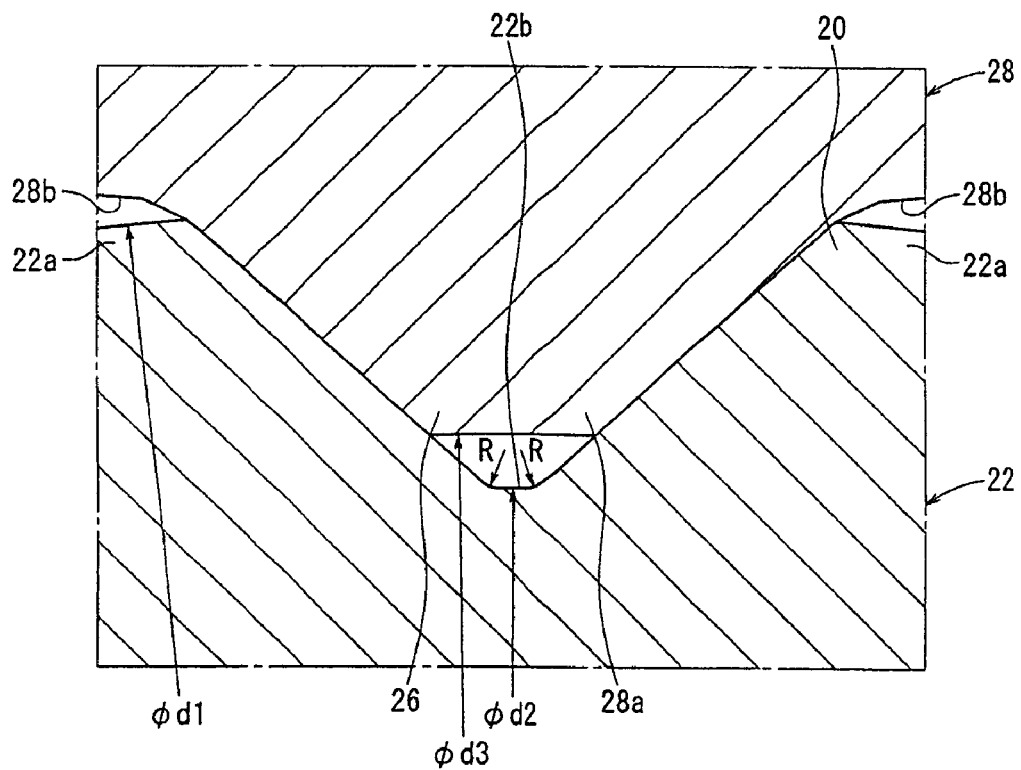
FIG. 11 is an enlarged partial longitudinal cross-sectional view taken along line XI-XI of FIG. 3.
Figure 12:
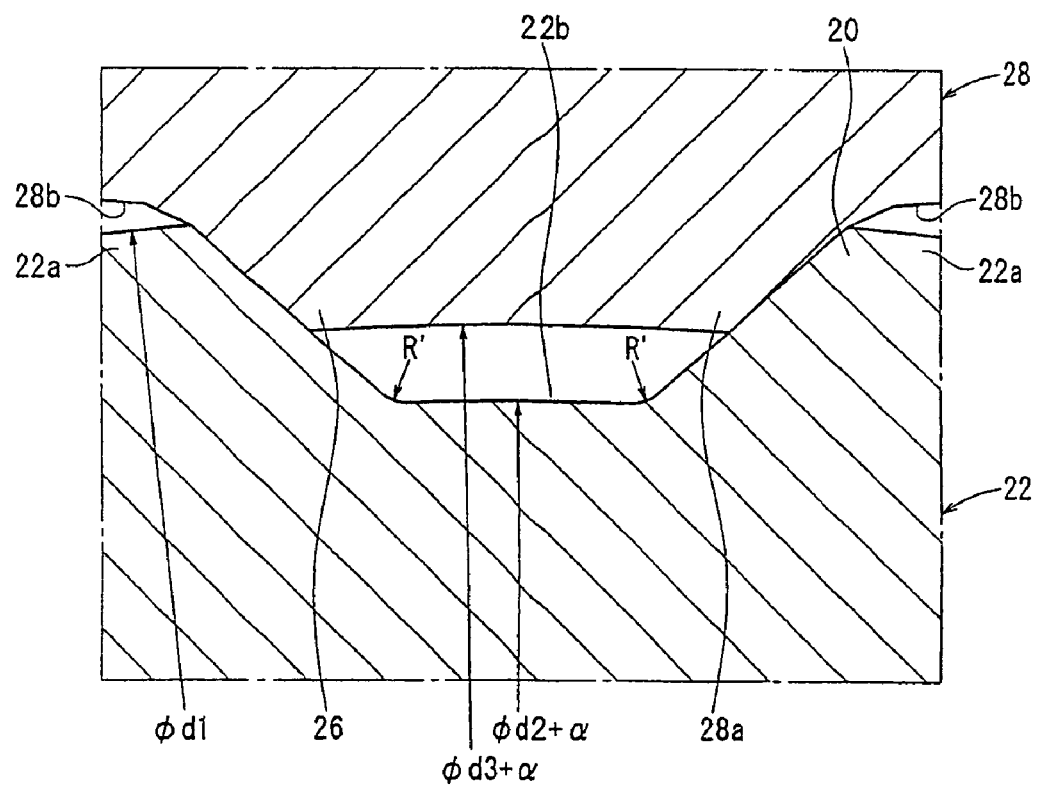
FIG. 12 is an enlarged partial longitudinal cross-sectional view taken along line XII-XII of FIG. 3.

FIGS. 11 and 12 are enlarged partial longitudinal cross-sectional views showing the manner in which the peak 28a of the hub tooth section 28 contacts the valley 22b of the shaft tooth section 22 at the time the shaft 12 and the hub 14 are assembled together. In FIGS. 11 and 12, φd1 through φd3 represent pitch circle radii from the central axis of the shaft 12.

Since the shaft tooth section 22 is straight in shape and the hub tooth section 28 is straight in shape, the side surfaces of the shaft tooth section 22 and the hub tooth section 28 are held in fact-to-face contact with each other at all times (see FIGS. 2, 11, and 12).

As can be understood from a comparison between FIGS. 11 and 12, the radii φd2, φd3 of the shaft tooth section 22 in a stress concentrating region can be increased by a by forming the first step region 30 (see FIG. 3) and the second step region 32 (see FIG. 3) in portions of the shaft tooth section 22 and the hub tooth section 28 which are close to the shaft shank 24.

Since the radii φd2, φd3 of the shaft tooth section 22 in the stress concentrating region are increased by α, the radius of curvature of the bottom land R of the valley 22b of the shaft tooth section 22 can be increased for stress distribution (see R' in FIG. 12). Overall stresses (main stresses) can be lowered by increasing the radius of the region close to the shaft shank 24 as compared with other regions.

According to the first embodiment, as described above, the point P1 as a starting point of the first step region 30 of the shaft 12 and the point P2 as a starting point of the second step region 32 of the hub 14 are offset substantially horizontally from each other by the distance L4.

Therefore, when torque is applied to the shaft/hub unit 10 wherein the shaft tooth section 22 and the hub tooth section 28 mesh with each other, the stresses imposed on the shaft/hub unit 10 are distributed to the points P1, P2, thereby relaxing stress concentration. Consequently, static mechanical strength and fatigue strength of the area where the shaft tooth section 22 and the hub tooth section 28 mesh with each other are increased.

Furthermore, by setting the tilt angle θ at the starting point P1 of the first step region 30 to a value in the range from 5 degrees to 45 degrees, the tapered surface 34 of the first step region 30 further relaxes stress concentration.

With the shaft 12 used as a power transmitting shaft and the hub 14 as an inner member housed in an outer member of a constant velocity joint, when torque is transmitted from the power transmitting shaft to the hub 14, stresses concentrating on the area where the shaft 12 and the hub 14 engage each other are appropriately relaxed, allowing the drive power to be transmitted reliably to the outer member of the constant velocity joint.

In the embodiments to be described below, those parts of shaft/hub units which are identical to those of the shaft/hub unit 10 according to the first embodiment will not be described in detail below. Those parts which operate in the same manner as and offer the same advantages as those according to the first embodiment will not be described in detail below.

Figure 13:
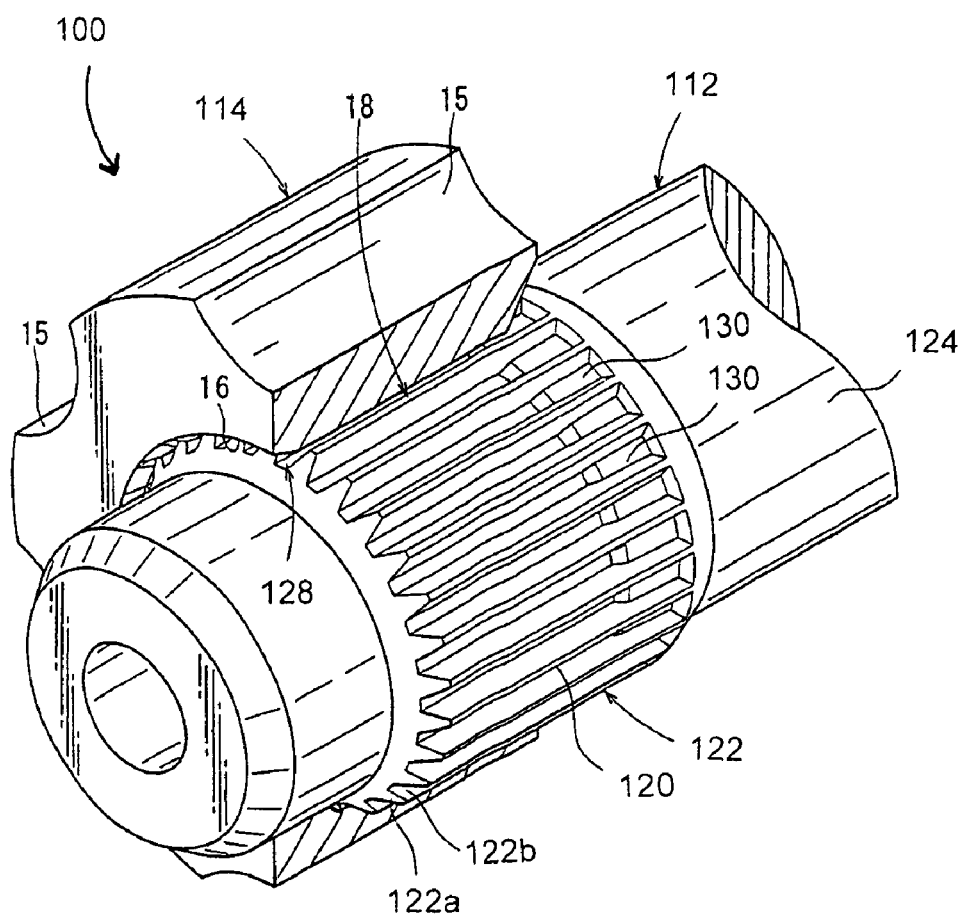
FIG. 13 is a perspective view, partly cut away, of a shaft/hub unit which incorporates a power transmitting mechanism according to a second embodiment of the present invention.
Figure 14:
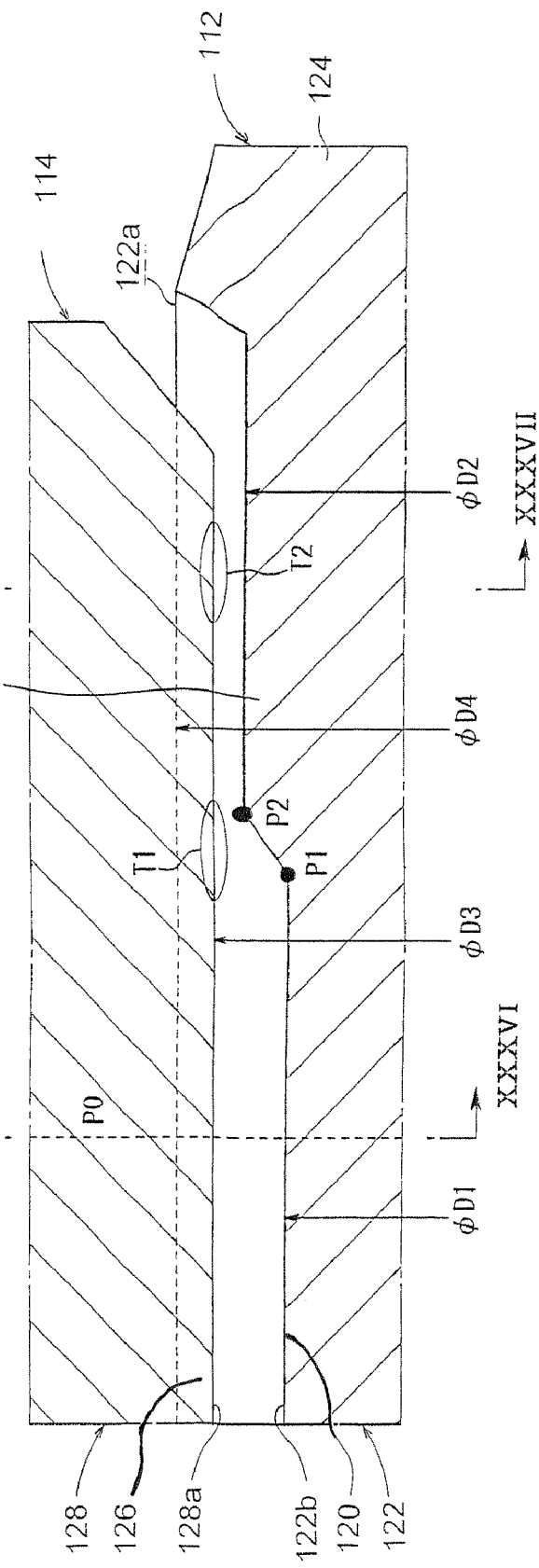
FIG. 14 is an enlarged partial longitudinal cross-sectional view in the axial direction of a shaft, showing a peak of a hub tooth section which engages in a valley of a shaft tooth section shown in FIG. 13.

FIG. 13 shows a shaft/hub unit 100 which incorporates a power transmitting mechanism according to a second embodiment of the present invention. FIG. 14 shows, in enlarged partial longitudinal cross section in the axial direction of the shaft 112, that a peak 128a of a hub tooth section 128 engages in a valley 122b of a shaft tooth section 122.

As shown in FIG. 14, the valley 122b of the shaft tooth section 122 has a step region 130 extending horizontally a predetermined distance toward the shaft shank 124 and raised from a point P1, which is displaced a predetermined distance from the central point P0 toward the shaft shank 124, toward the hub tooth section 128 obliquely at a predetermined angle.

The step region 130 extends horizontally a predetermined distance from the central point P2 and is joined to the shaft shank 124. Stated otherwise, the radius of the shaft tooth section 122 changes from a valley radius φD1 at the valley 122b to a valley radius φD2 at the step region 130.

The step region 130 may have a slanted surface or an arcuate curved surface or a compound surface having a predetermined radius of curvature.

Figure 15:
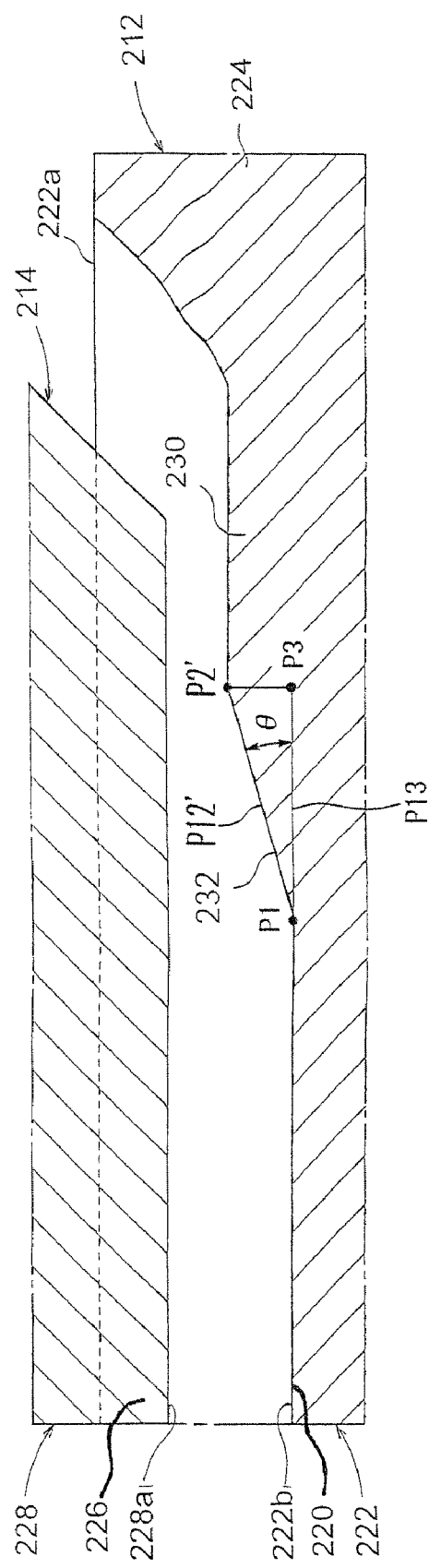
FIG. 15 is an enlarged partial longitudinal cross-sectional view showing a first tapered region having a small tilt angle θ in a step region of the shaft shown in FIG. 14.

The peak 122a, 222a of the shank tooth section 122, 222 has an outside diameter which remains constant in the axial direction, as shown in FIGS. 14 and 15.

The peak 128a of the hub tooth section 128 has its inside radius φD3 remaining constant in the axial direction of the hub 114, and the valley 128b (FIGS. 17-18) of the hub tooth section 128 also has its inside radius φD4 remaining constant in the axial direction of the hub 114.

The valley radii φD1, φD2 represent a distance from the central axis of the shaft 112 to the bottom land of the valley 122b of the shaft tooth section 122. The peak radius φD3 represents a distance from the central axis of the shaft 112 to the top land of the peak 128a of the hub tooth section 128.

Therefore, when torque is applied to the shaft/hub unit 100 wherein the shaft tooth section 122 and the hub tooth section 128 mesh with each other, stresses applied to the shaft/hub unit 100 are distributed to an area T1 of the hub tooth section 128 which faces the point P1 in the shaft tooth section 122 and an area T2 of the hub tooth section 128 which faces the step region 130 of the shaft tooth section 122, so that the concentration of stresses is relaxed (see FIG. 14).

As a result, since the concentration of stresses is relaxed, but stresses are distributed, static mechanical strength and fatigue strength of the area where the shaft tooth section 122 and the hub tooth section 128 mesh with each other are increased.

In FIG. 15, a right-angled triangle formed by interconnecting points P1, P2', P3 in the valley 222b of the shaft tooth section 222 may have its cross-sectional area increased, and the angle θ formed between a line segment P13 interconnecting the points P1, P3 and a line segment P12' interconnecting the points P1, P2', i.e., the tilt angle θ of the step region 230, may be set to a small value for further relaxing stress concentration with a first tapered surface 232 of the step region 230.

The relationship between the tilt angle θ of the step region 230 (first tapered surface 232), stress relaxation, and productivity is shown in FIG. 16. It can be seen from FIG. 16 that stress relaxation and productivity are good (see symbol "○") if the tilt angle θ is set to a value in the range from 5 degrees to 45 degrees, and optimum (see symbol "◉") if the tilt angle θ is set to a value in the range from 10 degrees to 35 degrees.

If the tilt angle θ is set to a value less than 5 degrees, no sufficient stress distribution capability is available, and it is difficult to manufacture the shaft tooth section 222 with rolling racks, to be described later. If the tilt angle θ is set to a value in excess of 45 degrees, excessive stresses concentrate on the step-like step region 230, and the durability of rolling racks used to manufacture the shaft tooth section 222 is reduced.

An ordinary shaft/hub spline fitting arrangement which is free of the step region 130, 230 has a stress peak point produced in the vicinity of the shaft shank 124, 224. According to the second embodiment, however, the step region 130, 230 is provided in the shaft tooth section 122, 222 to allow some stresses to concentrate on the hub tooth section 128, 228 facing the point P1, thus distributing stresses that tend to concentrate on the shaft shank 124, 224. If the tilt angle θ of the step region 130, 230 in the shaft tooth section 122, 222 is set to too a large value, e.g., 90 degrees, for example, then excessive stresses concentrate on the hub tooth section 128, 228 facing the point P1, failing to provide a stress distributing (stress relaxing) capability. By setting the tilt angle θ, i.e., the rise angle, of the step region 130, 230 to an appropriate value, the concentration of stresses in the vicinity of the shaft shank 124, 224 is suitably distributed to reduce stresses at the peak point.

A characteristic curve A (broken-line curve) of stresses on a comparative shaft wherein the step region 130, 230 is not formed in the shaft tooth section 122, 222 and a characteristic curve B (solid-line curve) of stresses on a shaft wherein the step region 130, 230 starting from the starting point P1 is formed in the shaft tooth section 122, 222, are identical to those shown in FIG. 7 according to the first embodiment. It can be understood that a comparison between the characteristic curve A and the characteristic curve B indicates that according to the characteristic curve B which represents the structure having the step region 130, 230, the peak of stresses is reduced and the concentration of stresses is relaxed.

A characteristic curve C of stresses on a shaft wherein the tilt angle θ of the step region 130, 230 is smaller than with the characteristic curve B is identical to that shown in FIG. 8 according to the first embodiment. It can be understood that the first tapered surface 232 with the smaller tilt angle θ is effective in more stress relaxation.

The peak points of stresses imposed depending on applied loads reside in substantially the same measuring position D as indicated by points a, b, c, as with the first embodiment (see FIG. 10).

Figure 17:
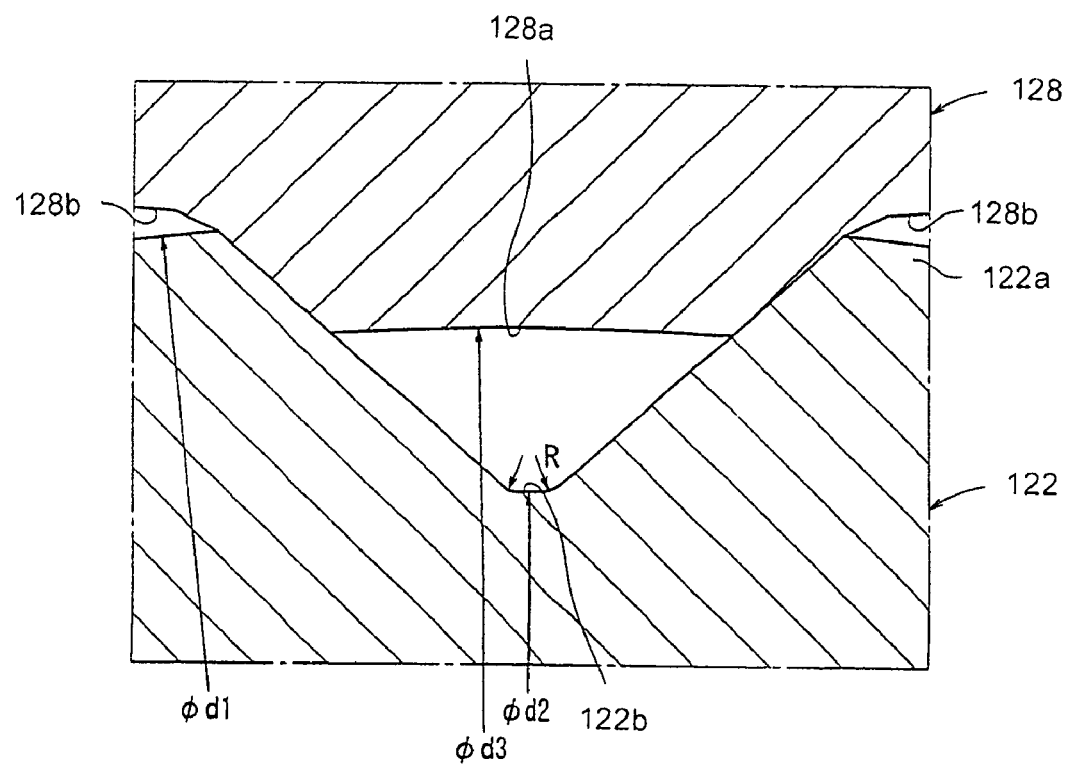
FIG. 17 is an enlarged partial longitudinal cross-sectional view taken along line XXXVI-XXXVI of FIG. 14.
Figure 18:
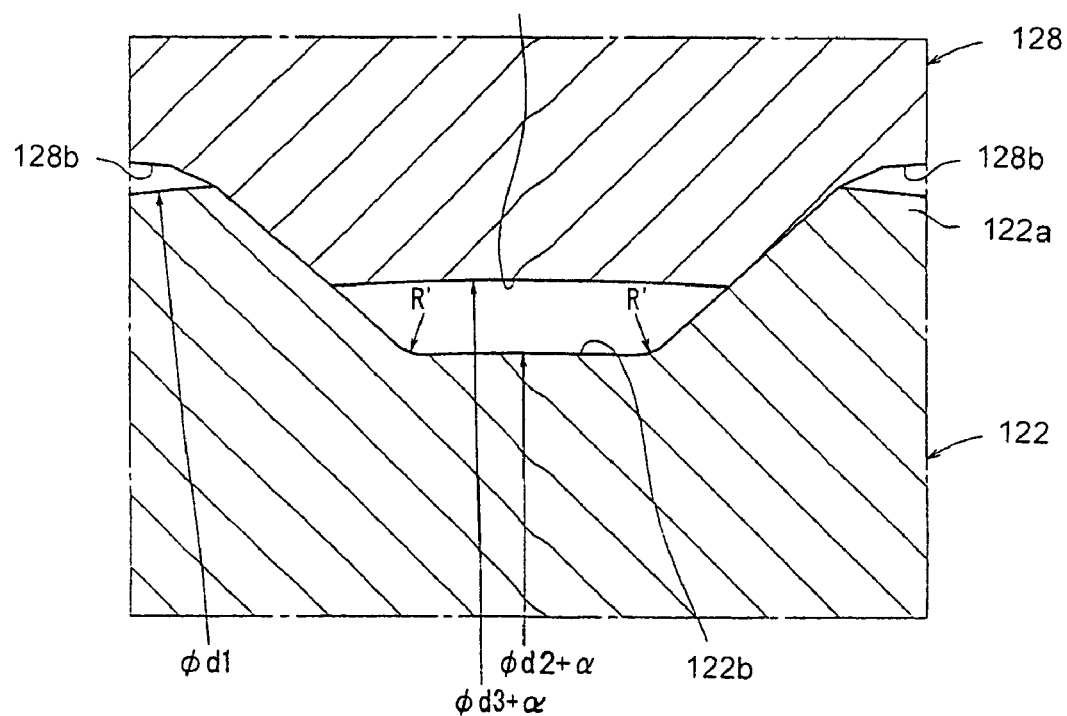
FIG. 18 is an enlarged partial longitudinal cross-sectional view taken along line XXXVII-XXXVII of FIG. 14.

FIGS. 17 and 18 are enlarged partial longitudinal cross-sectional views showing the manner in which the peak 128a, 228a of the hub tooth section 128, 228 contacts the valley 122b, 222b of the shaft tooth section 122, 222 at the time the shaft 112, 212 and the hub 114, 214 are assembled together. The operation and advantages of the shaft/hub unit 100 are identical to those of the shaft/hub unit 10 shown in FIGS. 11 and 12, and will not be described in detail below.

A process of manufacturing the spline teeth 120, 220 of the shaft tooth section 122, 222 will be described below.

Figure 19:
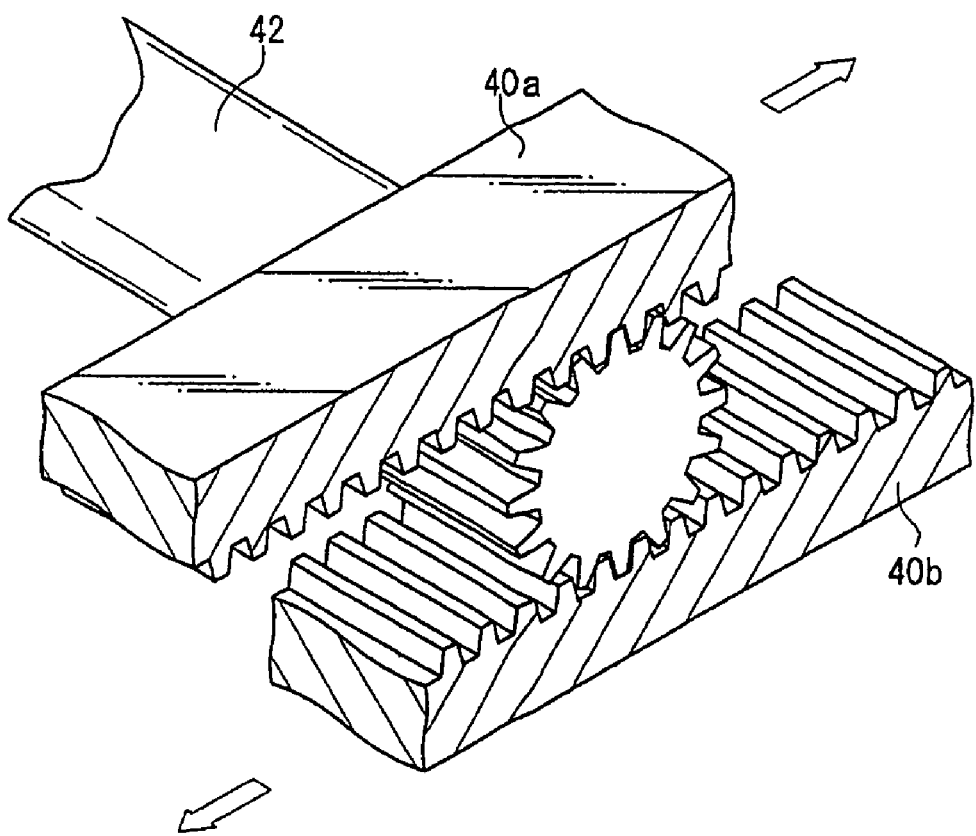
FIG. 19 is a fragmentary perspective view showing the manner in which the spline teeth of a shaft tooth section are formed by rolling racks.

As shown in FIG. 19, a rod-shaped workpiece 42 which has been machined into a predetermined shape by a tool in a previous machining process is inserted between upper and lower rolling racks 40a, 40b each made of a hard material and having a substantially rectangular shape. While the rolling racks 40a, 40b are being pressed against the workpiece 42, the rolling racks 40a, 40b are displaced in opposite directions indicated by the arrows by an actuator (not shown) to form splines on the outer circumferential surface of the workpiece 42.

The spline teeth 120, 220 of the shaft tooth section 122, 222 can thus easily be formed by the above rolling process. Tool grooves (tool marks) having a depth of about 50 μm are formed in the top lands of the spline teeth 120, 220 of the shaft tooth section 122, 222 by the tool in the previous machining process.

The roiling process can form the spline teeth 126, 226 in shorter cycles and allows the rolling racks 40a, 40b to have a longer service life than a pressing process (forging process). According to the rolling process, the forming teeth of the rolling racks 40a, 40b can be polished again for reuse. The rolling process is more advantageous as to cost from the standpoints of service life, forming cycle, and rack reusability than the pressing process (forging process).

However, since the spline teeth are formed by a material flow toward the top lands thereof in the rolling process, the top lands of the spline teeth formed by the rolling process may not necessarily be uniform in shape.

While this invention has been described in conjunction with the exemplary aspects outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

The invention claimed is:

1. A power transmission mechanism comprising a shaft and a hub, the power transmission mechanism further comprising:
    a shaft tooth section formed on the shaft;
    a hub tooth section formed on the hub; and
    a retaining ring, wherein the hub is axially secured relative to the shaft by the retaining ring in a position disposed around the shaft while holding the shaft tooth section and the hub tooth section in engagement with each other,
    wherein said shaft tooth section has a straight peak having a constant tooth thickness and a valley having an outside diameter varying from an end of the shaft toward a shaft shank of the shaft, said valley having a step region sloped toward said hub tooth section obliquely at a predetermined angle, wherein a valley radius of said shaft tooth section representing a distance from a central axis of the shaft to a bottom land of said valley is constant from the step region to the end of the shaft; and
    said hub tooth section has a straight peak opposing the step region of said shaft tooth section, and opposing and engaging said valley of said shaft tooth section, said peak of said hub tooth section having a constant tooth thickness and a valley, said peak of said hub tooth section has a constant inside diameter ($\phi D3$) which radially opposes the valley and step region of the shaft tooth section from the end of the shaft toward said shaft shank in an axial direction of the shaft.

2. A mechanism according to claim 1, wherein said step region has a tilt angle ($\theta$) set to a value ranging from 5 degrees to 45 degrees.

* * * * *

UNITED STATES PATENT AND TRADEMARK OFFICE
CERTIFICATE OF CORRECTION

| | |
|---|---|
| PATENT NO. | : 8,043,023 B2 |
| APPLICATION NO. | : 10/567404 |
| DATED | : October 25, 2011 |
| INVENTOR(S) | : Masahiko Igarashi et al. |

Page 1 of 1

It is certified that error appears in the above-identified patent and that said Letters Patent is hereby corrected as shown below:

On the Title Page, item [22]

(22)　　PCT Filed:　　~~Mar. 8, 2004~~

Should be:

(22)　　PCT Filed:　　Aug. 3, 2004

Signed and Sealed this
Third Day of April, 2012

David J. Kappos
*Director of the United States Patent and Trademark Office*